United States Patent [19]

Ochs et al.

[11] Patent Number: 5,352,157
[45] Date of Patent: Oct. 4, 1994

[54] SPEED-ADAPTIVE TORSIONAL VIBRATION DAMPER

[75] Inventors: Winfried Ochs, Alsbach-Hähnlein; Bernhard Röhrig, Heppenheim, both of Fed. Rep. of Germany

[73] Assignee: Firma Carl Freudenberg, Hohnerweg, Fed. Rep. of Germany

[21] Appl. No.: 6,003

[22] Filed: Jan. 15, 1993

[30] Foreign Application Priority Data

Jan. 17, 1992 [DE] Fed. Rep. of Germany ....... 4201049

[51] Int. Cl.$^5$ ............................................. F16D 3/12
[52] U.S. Cl. ....................................... 464/89; 464/180
[58] Field of Search ................... 464/89, 83, 160, 180; 74/574

[56] References Cited

U.S. PATENT DOCUMENTS

| | | | |
|---|---|---|---|
| 3,386,264 | 6/1968 | Paulsen | 464/83 X |
| 4,424,046 | 1/1984 | Ziegler | 464/83 X |
| 4,734,079 | 3/1989 | Viers | 464/83 |
| 4,914,949 | 4/1990 | Andrä et al. | 464/89 X |
| 5,138,902 | 8/1992 | Müller et al. | 464/83 X |

FOREIGN PATENT DOCUMENTS

| | | |
|---|---|---|
| 3633414 | 3/1922 | Fed. Rep. of Germany . |
| 3010127 | 9/1981 | Fed. Rep. of Germany ........ 464/83 |

Primary Examiner—Daniel P. Stodola
Assistant Examiner—Eileen A. Dunn
Attorney, Agent, or Firm—Kenyon & Kenyon

[57] ABSTRACT

A speed-adaptive torsional vibration damper, with a flywheel which encircles a hub ring, and in which the hub ring and flywheel are at least temporarily connected to one another by first and second spring elements made of a rubber-like material. The second spring elements are distributed uniformly around the circumference of the hub ring. The second spring elements are capable of expanding in the radial direction under the action of centrifugal forces that result at high rotational speeds, and thereby are forced into engagement with the flywheel. When viewed in the circumferential direction, the second spring elements are delimited by a stop face which projects in the direction of the flywheel and which mates with a congruently shaped cavity of a third spring element also of a rubber-like material. The third spring elements are affixed to the flywheel. The stop face and the cavity have a radial clearance between each other in the non-rotating state of the torsional vibration damper.

5 Claims, 3 Drawing Sheets

SPEED-ADAPTIVE TORSIONAL VIBRATION DAMPER

The present invention relates to a speed-adaptive torsional vibration damper. In the present invention, a flywheel encircles a hub ring in a radial direction and the hub ring and flywheel are at least temporarily connected parallel to one another by means of first and second spring elements made of a rubber-like material. The first and second spring elements are uniformly distributed in the circumferential direction and have a columnar design. The second spring elements comprise a supplementary part and are capable of expanding in the radial direction under the action of centrifugal forces that result during high rotational speeds. As a result, the second spring elements are forced into supplemental engagement with the flywheel.

A torsional vibration damper is disclosed by the German Published Patent Application 36 33 414. When this vibration damper is not rotating, the outside of second spring elements, which are prestressed by the first spring elements, are spaced from the inner side of the flywheel via a clearance. At a desired rotational speed, the second spring elements come into contact with the inner side of the flywheel, in dependence upon the centrifugal force. This contact results in a coupling in parallel of the spring action of the second spring elements to the spring action of the first spring elements. In the device of this German patent application, if torsional vibrations occur when the second spring elements come up against the inner side of the flywheel, relative movement cannot be avoided between the second spring elements, in which a supplementary part is embedded, and the inner side of the flywheel. Frictional contact between the outer side of the second spring elements and the inner side of the flywheel is limited to a short period of time, but it nevertheless causes wear and tear in this area. The construction of the peripheral contact surfaces of the second spring elements and of the inner side of the flywheel make it impossible to adjust the increase in rigidity that occurs when the two parts come into contact with one another.

The object of the present invention is to provide a speed-adaptive torsional vibration damper which will allow wear and tear to be reduced in comparison to previously disclosed torsional vibration dampers and which will exhibit better working properties over a prolonged service life. These results are accomplished as the result of selectively adjusting the increase in rigidity during normal operation.

In the torsional vibration damper according to the present invention, the second spring elements are delimited by a stop face which projects in the direction of the flywheel and which mates with a similarly-shaped cavity of a third spring element made of a rubber-like material. The third spring elements are affixed to the flywheel. The stop face and the cavity are spaced from one another via a radial clearance in the non-rotating state of the torsional vibration damper. In an advantageous refinement of the present invention, the stop face can have a V-shaped form. This refinement produces a positive-locking connection during normal operational use of the torsional vibration damper when contact is made between the second and third spring elements and, as a result, prevents movement of the stop faces relative to one another—which can cause friction and thus promote wear. In the torsional vibration damper according to the present invention, the second spring elements do not contact the flywheel directly. Instead, there is a limit stop-type contact, as needed, between the second and third spring elements, both of which consist of a rubber-like elastic material. The refinement, according to the present invention, of the contact surfaces of the second spring elements and the third spring elements, as well as selective choice of the materials used, make it possible to adjust the increase in rigidity when the two spring elements contact one another. A limit stop with variable hardness can be adjusted depending upon the conditions of the particular application. The three spring elements can be arranged in different ways between the hub ring and the flywheel and can be designed, for example, to be connected in various ways to one another. If at least two of the three spring elements are integrally formed to be connected, the manufacturing of the torsional vibration damper according to the present invention is considerably simplified. Simplified manufacturing provides significant economic advantages.

During the start-up phase of the present invention, the second and the third spring elements exhibit an at least partially reciprocal radial clearance between each other. This clearance becomes smaller with rising rotational speed. Because the stop faces of the second and the third spring elements do not contact one another, wear and tear is ruled out during start-up. Any torsional vibrations during start-up are damped by the flexible compliance of the first spring elements arranged between the hub ring and the flywheel, and by the mass of the flywheel.

As the rotational speed rises, the second spring elements, which can have V-shaped form or a form similar to a sine curve, positions itself immovably against the surface of the cavity of the third spring elements, in dependence upon centrifugal force. The contact between the second and the third spring elements results in a parallel coupling with the first spring elements, whereby the damping action is dependent upon the total spring elasticity of all spring elements and the mass of the flywheel. The torsional vibration damper according to the present invention is well suited for fulfilling the task of damping torsional vibrations at high rotational speeds over an extremely long service life.

In dependence upon the conditions of a particular application, an inertial mass can be embedded in a partial area of the second spring elements which project in the direction of the flywheel. This inertial mass facilitates adjustment of the torsional vibration damper of the present invention, particularly for applications in the field of automotive engineering. A torsional vibration damper of the same outer shape can be used to damp different frequency ranges, depending on the size of the inertial mass used.

In one advantageous refinement, the second spring elements are separated from the hub ring by an annular gap in the circumferential sectors covered by the third spring elements, and are connected to the hub ring by supporting surfaces arranged outside of the circumferential sectors. Tensile stresses within the second spring elements can be avoided during normal operational use of the torsional vibration damper at high rotational speeds in this refinement, so that the service life can be prolonged further.

The radial clearance between the elevations of the second spring elements which protrude in the direction of the flywheel and the cavity-shaped depressions of the third spring elements can be adjusted according to operating condition. The size of the radial gap between the hub ring and the second spring elements, and the size of the inertial mass optionally embedded in the second spring elements can also be adjusted to fit the particular application.

Good working properties have been obtained for the speed-adaptive torsional vibration damper of the present invention when an imaginary normal surface is situated centrally in the stop face to intersect the supporting surfaces centrally between the hub ring and the second spring elements. This arrangement results in low mechanical stresses acting on the second and third spring elements, as well as the exact spatial association of the second and third spring elements, which engage one another in the higher rotational speed range.

Three examples of speed-adaptive torsional vibration dampers are depicted in the enclosed drawings, where:

Figure 1:
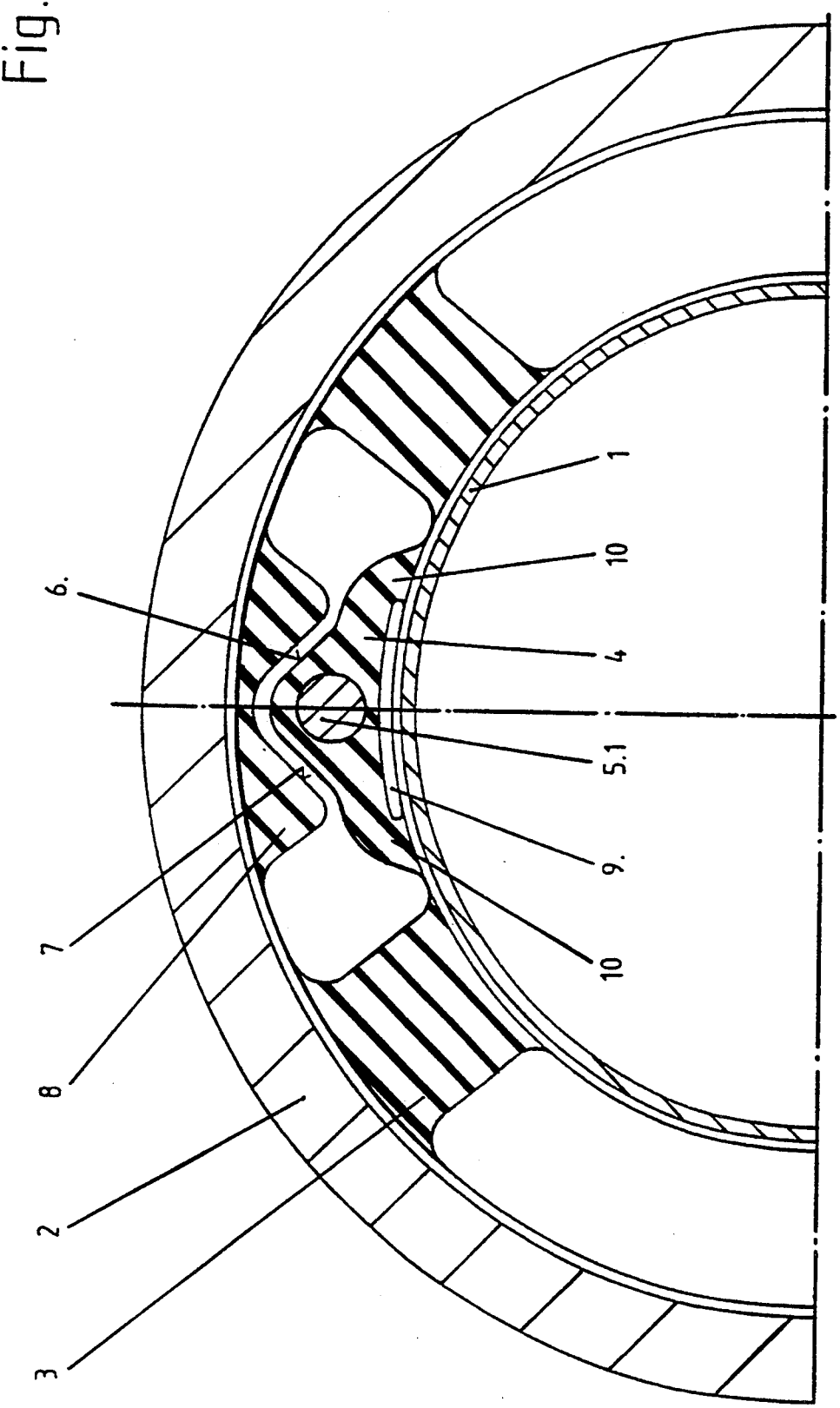
FIG. 1 shows a schematic representation of a first embodiment of the torsional vibration damper according to the present invention, in which the first, second and third spring elements are molded separately between the hub ring and the fly wheel.
Figure 2:
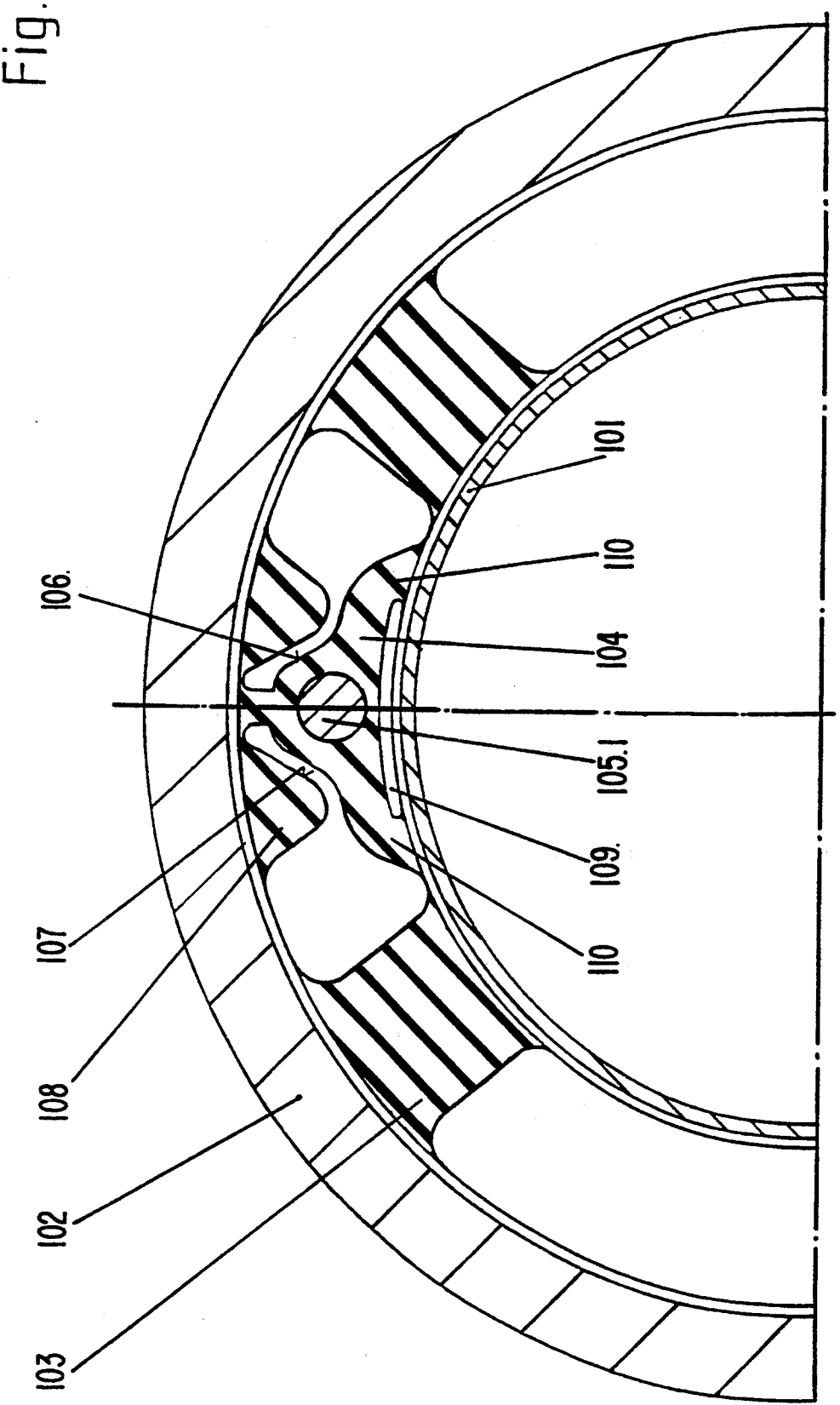
FIG. 2 shows a schematic representation of a second embodiment of the torsional vibration damper according to the present invention, in which the second and the third spring elements are connected to one another.
Figure 3:
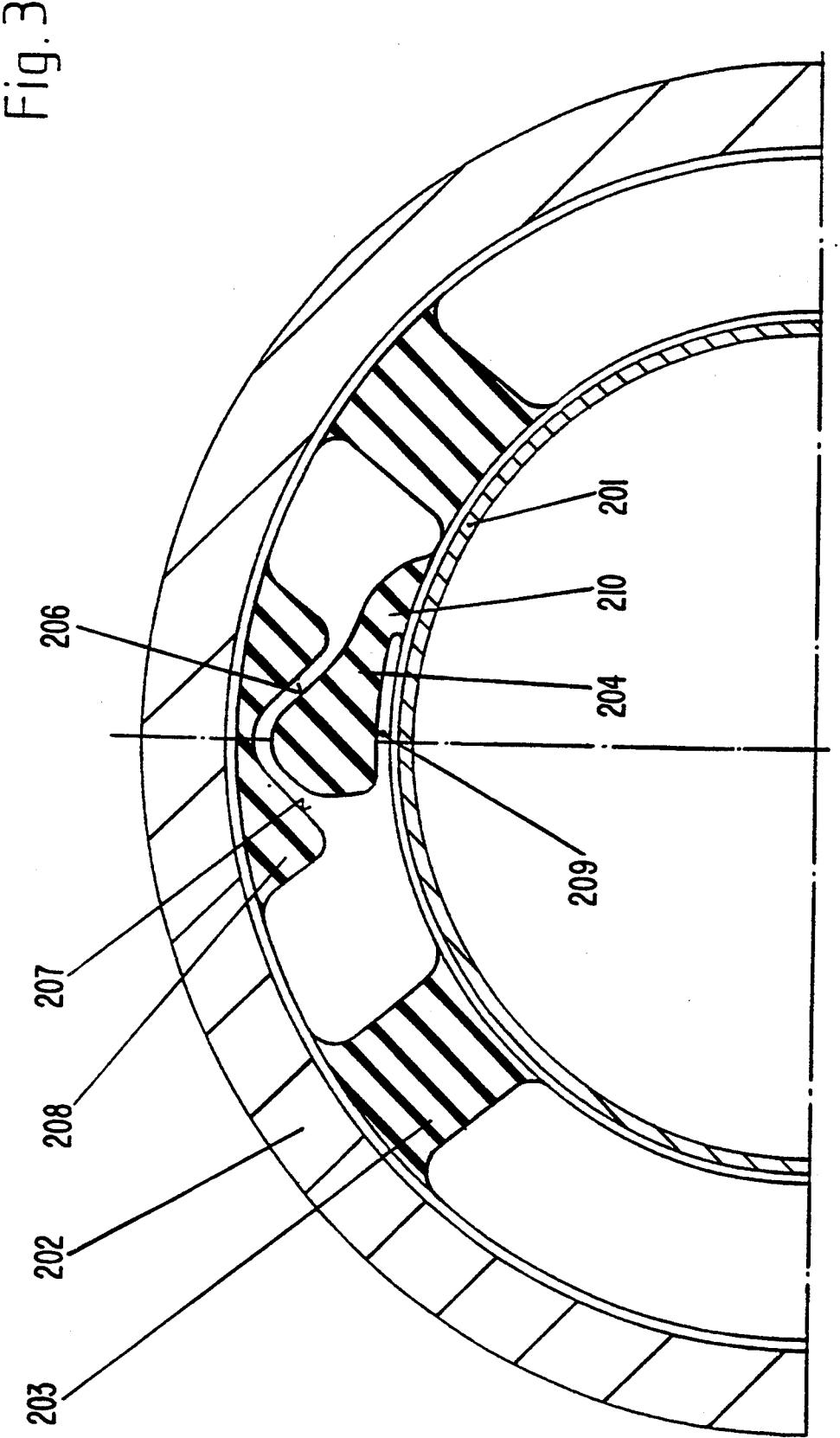
FIG. 3 shows a schematic representation of a third embodiment of the torsional vibration damper according to the present invention, in which the second spring elements are affixed on only one side to the hub ring.

The speed-adaptive torsional vibration dampers according to FIGS. 1-3 have a hub ring 1, 101, 201 and a flywheel 2, 102, 202 the flywheel 2, 102, 202 encircling the hub ring 1, 101, 201 radially. The flywheel 2, 102, 202 and the hub ring 1, 101, 201 are interconnected by means of first spring elements 3, 103, 203 which are distributed circumferentially. The torsional vibration dampers are depicted in FIGS. 1-3 in a non-rotating state, to show the radial gap between the second spring elements 4, 104, 204 and the third spring elements 8, 108, 208.

The second spring element 4, 104, 204 is bounded in FIGS. 1, 2 and 3 by an essentially V-shaped stop face 6, 106, 206, which projects in the direction of the flywheel 2, 102, 202 and can be forced to engage a similarly-shaped cavity 7, 107, 207 of the third spring element 8, 108, 208. In FIGS. 1 and 2, the second spring element 4, 104 surrounds a supplementary part in the form of an inertial mass 5.1, 105.1 which can comprise, for example, a metal cylinder. When high rotational speeds are introduced, the inertial mass 5.1, 105.1 amplifies centrifugal forces in the radial direction. As a result, the second spring element 4, 014 is expansible and is forced to engage the third spring element 8, 108. The third spring element 8, 108 is premolded, immovably, on to the flywheel 2, 102.

In the circumferential sector covered by the third spring element 8, 108, 208, the second spring element 4, 104, 204 and the hub ring 1 define an annular gap 9, 109, 209. The second spring element 4, 104, 204 is provided outside of the circumferential sector with supporting surfaces 10, 110, 210 and is premolded on to the hub ring 1, 101, 201 . During normal operation of the torsional vibration damper, the radial gap 9, 109, 209 gives rise to a clear reduction in tensile stresses within the second spring element 4, 104, 204 and simpler adjustment of the torsional vibration damper to the conditions of the particular application. Contrary to the specific embodiment of FIG. 1, in which all the spring elements 3, 4, 8 are formed separately and are not interconnected, the second and third spring elements 104, 108 of FIG. 2 are connected to one another. In this embodiment, the connection between the spring elements is at the point of highest elevation of the sine-shaped profile of the second spring element 104 and in the area of the lowest depression of the cavity 107 of the third spring element 108. Other connecting points between the spring elements can likewise be foreseen, as well as a connection between the first and the second 104 and/or the first 103 and the third spring elements 1088. The damping characteristics can be influenced by the form of the spring elements, as well by the materials used and by the mass of the flywheel 2, 102, 202 and/or the inertial mass 5.1, 105.1.

FIG. 3 depicts another embodiment of the present invention, whereby, contrary to the embodiments according to FIGS. 1 and 2, the second spring element 204 is affixed on only one side to the hub ring 20. The annular gap 209 is open on one side in the circumferential direction. This arrangement results in excellent mobility of the second spring element 204 in the radial direction during normal operational use of the torsional vibration damper. On the side that is not connected to the hub ring 201, the tentacle-shaped second spring element 204 is shaped to correspond to the cavity 207 of the third spring element 208 and is capable of being forced into engagement with this cavity in dependence upon centrifugal force. In some instances, an inertial mass 5.1, 105.1 as shown in FIGS. 1 and 2 is not needed in the embodiment of FIG. 3, since the inertial mass of the second spring element 204, which is capable of vibration in the radial direction to the outside, can be designed to fit the conditions of the particular application.

We claim:

1. A torsional vibration damper comprising:
   a hub ring;
   a flywheel encircling said hub ring;
   at least one first spring element connecting said flywheel and said hub ring;
   at least one second spring element connected to said hub ring, said at least one second spring element being capable of expansion in a radial direction towards said flywheel under the action of centrifugal forces caused by rotation of the hub ring, each said second spring element comprising a stop face which projects in the direction of the flywheel;
   at least one third spring element connected to said flywheel, each said third spring element comprising a cavity shaped to receive said stop face, each said third spring element comprising an engagement face, wherein there is a clearance space between said stop face and said engagement face when the torsional vibration damper is not rotating, and wherein centrifugal forces caused by rotation of the hub ring allow said stop face to engage said engagement face.

2. The torsional vibration damper according to claim 1, wherein: the stop face has a V-shaped form.

3. The torsional vibration damper according to claim 1, further comprising:
   an inertial mass embedded in each said second spring element.

4. The torsional vibration damper according to claim 1, wherein:

each said second spring element is separated from said hub ring by a radial gap located in a circumferential sector corresponding to the length of said stop face and each said second spring element is connected to said hub ring at at least one point outside of said circumferential sector.

5. The torsional vibration damper according to claim 1, wherein: each said stop face is located centrally within the corresponding cavity.

* * * * *

UNITED STATES PATENT AND TRADEMARK OFFICE
CERTIFICATE OF CORRECTION

PATENT NO. : 5,352,157
DATED : October 4, 1994
INVENTOR(S) : OCHS et al.

It is certified that error appears in the above-indentified patent and that said Letters Patent is hereby corrected as shown below:

Column 3, line 54, "014" should be --104--;

Column 4, line 13, "1088" should be --108--; and

Column 4, line 21 "20" should be --201--.

Signed and Sealed this

Fourteenth Day of March, 1995

Attest:

BRUCE LEHMAN

Attesting Officer     Commissioner of Patents and Trademarks